United States Patent [19]

Orthman

[11] 4,228,860
[45] Oct. 21, 1980

[54] APPARATUS FOR SYNCHRONIZING THE STEERING DISC AND ROW FOLLOWER MEANS OF A ROW CROP IMPLEMENT

[75] Inventor: Henry K. Orthman, Lexington, Nebr.

[73] Assignee: Orthman Manufacturing, Inc., Lexington, Nebr.

[21] Appl. No.: 947,037

[22] Filed: Sep. 29, 1978

[51] Int. Cl.³ .............................................. A01B 69/06
[52] U.S. Cl. ...................................... 172/26; 172/190
[58] Field of Search .................. 172/5, 6, 23, 26, 166, 172/190; 180/79, 131; 104/244.1

[56] References Cited

U.S. PATENT DOCUMENTS

| | | | |
|---|---|---|---|
| 3,430,723 | 3/1969 | Brooks | 180/79 |
| 3,581,838 | 6/1971 | Rhodes | 180/79 |

FOREIGN PATENT DOCUMENTS

| | | | |
|---|---|---|---|
| 520947 | 9/1976 | U.S.S.R. | 172/5 |
| 536769 | 12/1976 | U.S.S.R. | 172/190 |

*Primary Examiner*—Richard T. Stouffer
*Attorney, Agent, or Firm*—Zarley, McKee, Thomte, Voorhees & Sease

[57] ABSTRACT

In a row crop implement having an elongated tool bar, a steerable coulter disc, a row follower mechanism connected to the tool bar, and a device for steering the coulter disc in response to movement of the row follower mechanism, an apparatus for synchronizing the steering disc and row follower mechanism. A first mechanism is provided for moving the row follower mechanism to a neutral position corresponding to a transversely aligned position for the tool bar relative to the crop rows. A second mechanism is provided for disabling and enabling the steering device and a third mechanism is provided for steering the disc, while the steering device is disabled, to a position for straight ahead movement of the implement whereby upon enablement of the steering device, the row follower mechanism and coulter disc are disposed in synchronized relation.

14 Claims, 11 Drawing Figures

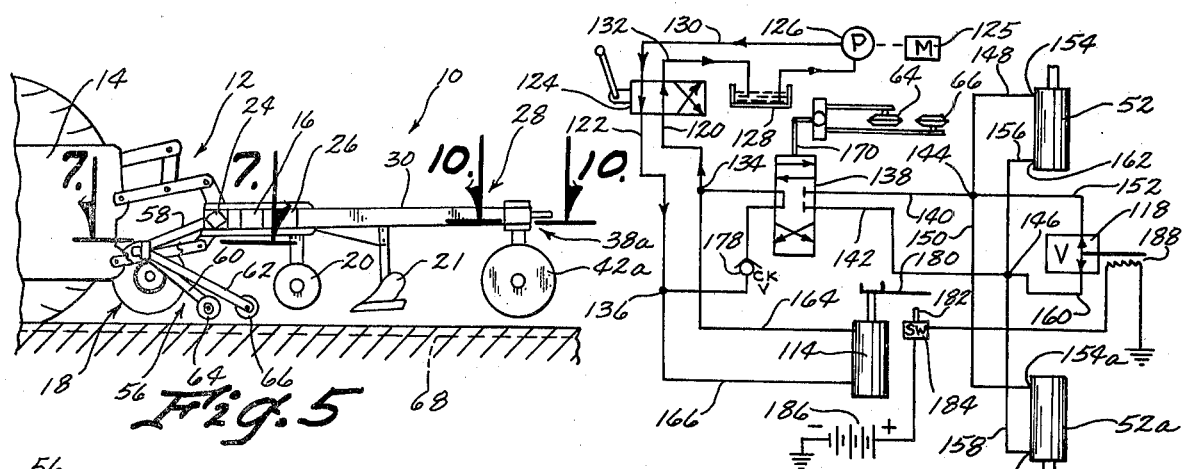
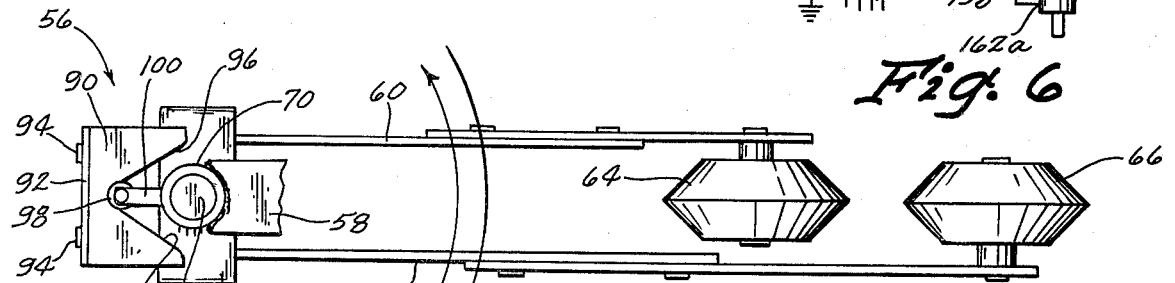
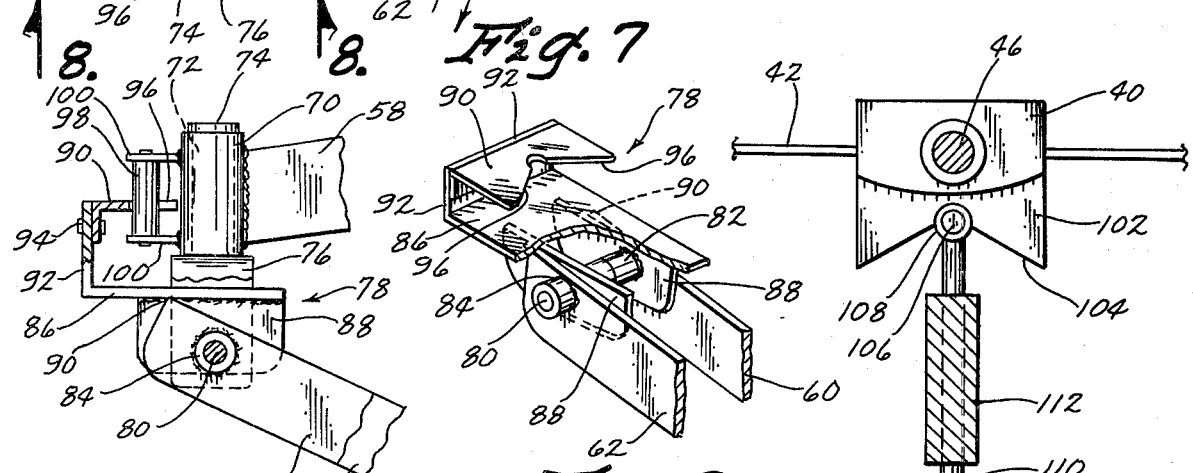
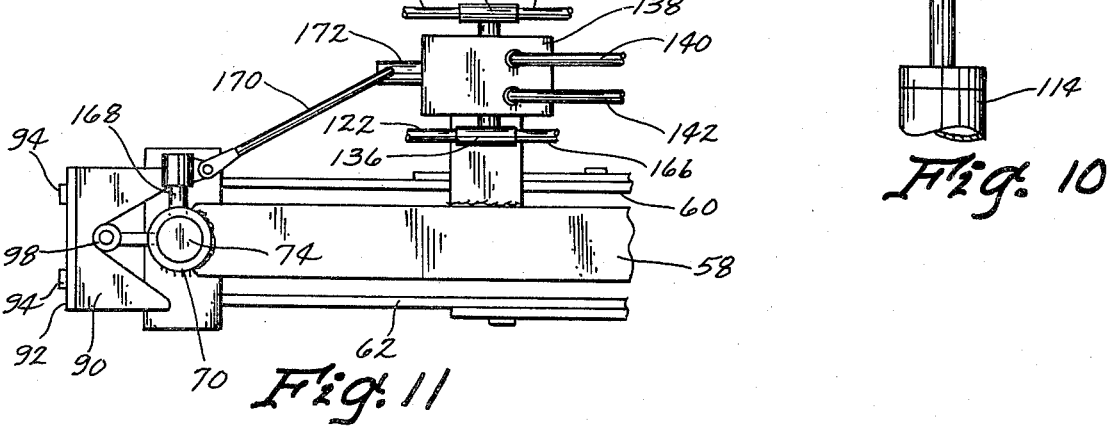

APPARATUS FOR SYNCHRONIZING THE STEERING DISC AND ROW FOLLOWER MEANS OF A ROW CROP IMPLEMENT

BACKGROUND OF THE INVENTION

The present invention relates generally to a row crop implement having a steering device for maintaining the implement in transverse alignment relative to the crop rows. More particularly, the present invention relates to an apparatus for synchronizing the steerable coulter disc and row follower means of such a row crop implement.

In applicant's previously filed patent application Ser. No. 851,937, filed on Nov. 16, 1977, now U.S. Pat. No. 4,184,551, there is shown and described a steering device for a row crop implement which minimizes and compensates for lateral shifting of the tool bar in response to transverse pressures exerted by the towing tractor. The steering device described therein is particularly suitable for the wide span implements commonly used with modern articulating type tractors and is believed to be a significant advance in the art. The present invention represents an improvement to that device.

The row crop implement described in applicant's above referenced previous application included a row follower means for detecting transverse drifting movements of the implement relative to the crop rows and a steerable coulter disc for steering the tool bar back to its transversely aligned position whenever the tool bar became offset relative to the row follower device. If the coulter discs were pivoted for corrective steering of the implement at the end of a crop row, it was necessary to place the implement down on the next row in the same offset relation in order to align the row follower means with the guide furrow of that row. Furthermore, it is necessary for the operator of the device of applicant's previously referred to application to periodically check that the coulter wheels are aligned for straight ahead movement of the implement when the row follower means is in its neutral position indicating that the tool bar is correctly positioned relative to the crop rows.

Accordingly, a primary object of the invention is to provide an improved steering device for a row crop implement.

A further object is to provide a row crop implement including a steering device and means for automatically monitoring and synchronizing the steerable coulter discs relative to the row follower mechanism.

A further object is to provide a steering device for a row crop implement in which the row follower mechanism and steerable coulter discs are automatically returned to the neutral positions therefor at the end of each crop row.

Finally, a further object of the invention is to provide an apparatus for synchronizing the steering disc and row follower means which is economical to manufacture, durable in use and efficient in operation.

SUMMARY OF THE INVENTION

The apparatus for synchronizing the steering disc and row follower means of a row crop implement according to the invention includes a first means for automatically moving the row follower means to the neutral position therefor and a second means for disabling the steering means which controls and steering movements of the disc. A third means adjustably steers the coulter disc, while the steering means is disabled, to a position for straight ahead movement of the implement so that the row follower means and coulter disc are disposed in synchronized relation upon enablement of the steering means.

The apparatus of the invention is automatically actuated when the implement is lifted on the tractor three-point hitch at the end of each row. Thus, as the farmer begins each new row, the implement may be set down in its transversely aligned or centered position relative to the crop rows regardless of whether or not the steering discs were pivoted for corrective steering movements at the end of the last row. Accordingly, the invention relieves the tractor operator of the responsibility for modifying the position at which the implement is set down at the beginning of each row. The resultant uniformity of operation allows the operator to set his tools closer to the crop and travel at faster speeds with less danger of crop damage.

BRIEF DESCRIPTION OF THE DRAWINGS

FIG. 5 is a side elevational view of an implement similar to FIG. 1, but showing the implement raised on the tractor three-point hitch;

FIG. 6 is a combined electrical schematic and fluid circuit diagram for the row crop implement in the synchronizing mode therefor;

FIG. 7 is a top detail plan view of the row follower means taken along line 7—7 in FIG. 5 with certain parts broken away for clarity;

FIG. 8 is a side, partially sectional view taken along line 8—8 in FIG. 7;

FIG. 9 is a detail perspective view of the floating trunnion lock of the invention;

FIG. 10 is a top, partially sectional view of the synchronizing mechanism for a steering disc as seen on line 10—10 in FIG. 5; and FIG. 11 is a top view of the connection of the row follower mechanism to the hydraulic circuit, as seen on line 11—11 in FIG. 3.

DESCRIPTION OF THE PREFERRED EMBODIMENT

Figure 1:
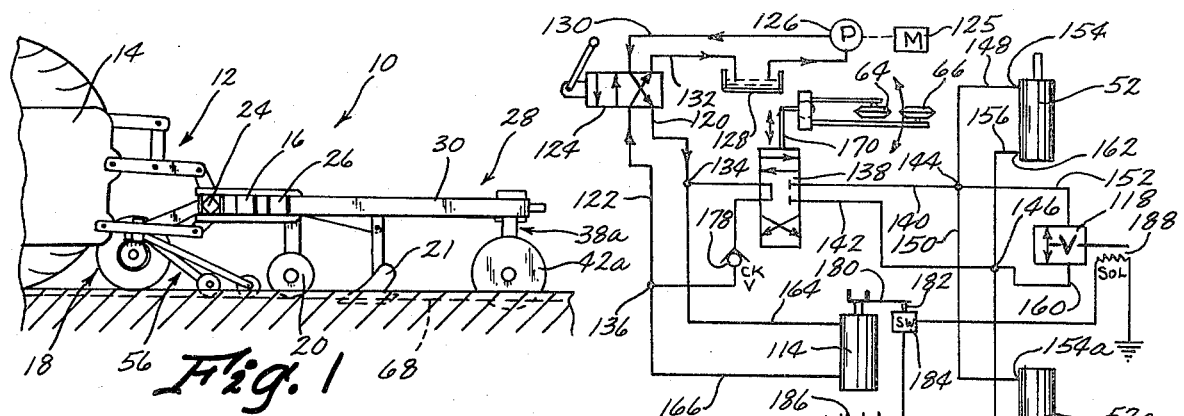
FIG 1 is a side elevational view of a hitch mounted cultivator implement including a steering apparatus.

A row crop implement 10 is shown in FIG. 1 mounted on the three-point hitch 12 of a tractor 14. It can be seen in FIG. 3 that implement 10 includes an elongated tool bar 16 on which there is mounted a plurality of vertically adjustable ground wheel assemblies, as indicated at 18 in FIG. 3, and a plurality of ground working tools, as indicated at 20 and 21 in FIG. 1.

Four longitudinal clamp assemblies 22 support hitch bar 24 forwardly of the tool bar and a cross bar 26 rearwardly of the tool bar 16. The combination of the hitch bar 24, tool bar 16 and ground working tools 20 and 21 is of course old in the art.

Figure 3:
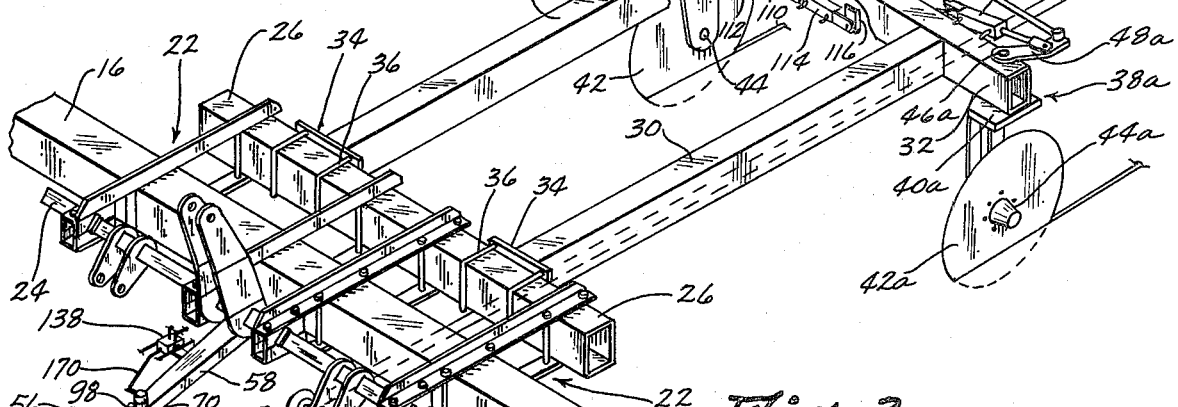
FIG. 3 is an enlarged perspective view of an implement tool bar and steering apparatus including the synchronizing apparatus of the invention.

Cross bar 26 supports a steering apparatus 28 of implement 10. Steering apparatus 28 includes a rigid frame comprising a pair of longitudinal arms 30 each rigidly connected to a rear frame cross member 32 as shown in FIG. 3. The forward ends of arms 30 are provided with upright clamp plates 34 which are rigidly secured to the rear side of cross bar 26 by respective pairs of U-bolts 36.

A pair of coulter disc assemblies 38 and 38a are pivotally carried on opposite ends of cross member 32. Since coulter disc assembly 38a is constructed substantially as the mirror image of coulter disc assembly 38, only the latter will be described in detail with like numbers followed by lower case "a" referring to like parts of assembly 38a.

Thus, coulter disc assembly 38 includes an inverted L-shaped fork 40 having a large coulter disc 42 rotatably supported at the lower end thereof on a generally horizontally extended stub shaft 44. A king pin 46 which extends upwardly from fork 40 is pivotally received within vertically aligned bores through one end of cross member 32. A steering arm 48 is secured to the upper end of king pin 46 and extends rearwardly therefrom generally parallel to the disc 42. A steering link 50 is pivotally connected to the ends of respective steering arms 48 and 48a for steering movement of the disc assemblies 38 and 38a in unison. Steering movement of the disc assemblies is controlled by a pair of double-acting hydraulic cylinder units 52 and 52a, each pivotally connected at one end to a medial portion of the respective steering arm 48 and 48a and pivotally connected at the other end to a respective cylinder-mounting flange 54 and 54a on the rearward side of cross member 32.

Also shown in FIG. 3 is a row follower mechanism 56 including a rigid forwardly extended support arm 58 on tool bar 16 and a pair of drag links 60 and 62 pivotally connected to support arm 58. Each drag link carries a respective finder wheel 64 and 66 at the opposite end thereof which is adapted to follow a guide furrow 68 (FIG. 3) formed in the ground by an attachment to the crop planter implement. The combination of the steering apparatus 28 and row follower mechanism 56 is so far substantially as described in my prior patent application Ser. No. 851,937.

The present invention is directed to an improvement for automatically synchronizing the coulter disc assemblies 38 and 38a with the row follower mechanism 56 such that the coulter discs 42 and 44 and positioned for straight ahead movement when the drag links are positioned parallel to respective longitudinal planes. The modifications of the row follower mechanism 56 will be described first followed by a discussion of the modifications to the steering apparatus 28 and finally a discussion of the hydraulic circuit for accomplishing the synchronizing operation.

Referring to FIGS. 3 and 7-9, an upright collar 70 is affixed to the forward end of support arm 58 by welding or the like. A first trunnion shaft 72 is pivotally received within collar 70. Shaft 72 has a head 74 on one end thereof and an inverted U-shaped fork 76 on the lower end thereof to vertically retain the shaft 72 within collar 70. A floating trunnion lock 78 is pivotally carried on a transverse shaft 80 supported at the lower end of fork 76.

The floating trunnion lock 78 includes bushings 82 and 84 welded to the drag links 60 and 62 respectively. Bushings 82 and 84 are rotatably carried on shaft 80. An L-shaped lock plate 86 has a pair of longitudinally directed depending flanges 88 with aligned holes for pivotally carrying the lock plate 86 on bushings 82 and 84. It can be seen that clockwise pivotal movement of the drag links 60 and 62 as seen in FIG. 8 causes the forward edge 90 of the drag links to strike the underside of the lock plate 86 to pivotally move it in a clockwise direction to the position shown in FIG. 8.

A rearwardly extending plate 90 is secured to the upstanding leg 92 of lock plate 86 by a pair of bolts 94. The rearward edge of plate 90 is provided with a recessed notch defining a generally V-shaped cam follower surface 96. A coacting cam means or upright cam post 98 is supported forwardly of collar 70 between a pair of forwardly extended ears 100. It can be seen with reference to FIGS. 7 and 8 that when lock plate 86 is pivoted clockwise to the position of FIG. 8, cam follower surface 96 is biased into engagement with cam post 98 with the result that the floating trunnion lock 78 is pivoted to the position of FIG. 7 wherein the drag links 60 and 62 are longitudinally disposed. This is the neutral position for the drag links 60 and 62, i.e. the position which they assume when the tool bar is transversely aligned relative to the crop rows. Thus the coacting cam post 98 and cam follower surface 96 on the floating trunnion lock 78 coact to provide a first means for moving the row follower mechanism 56 to the neutral position therefor.

Means are also provided for steerably positioning the coulter disc assemblies 38 and 38a for straight ahead movement of the implement in order to synchronize the coulter disc assemblies with the row follower mechanism when it is moved to its neutral position as described above. Specifically, referring to FIGS. 3 and 10, it is seen that the L-shaped fork 40 of coulter disk assembly 38 is additionally provided with an inwardly directed plate 102 having a recessed notch or V-shaped cam follower surface 104 on its inner edge. A coacting cam post 106 having a bearing sleeve 108 rotatable thereon is supported on one end of a rod 110 slidably carried in a sleeve 112 secured to the front side of frame cross member 32. The opposite end of slide rod 110 is pivotally connected to one end of a hydraulic cylinder unit 114, the other end of which is pivotally connected to a support bracket 116 on the forward side of cross member 32. Accordingly, upon extension of hydraulic cylinder unit 114, cam post 106 is biased into engagement with cam follower surface 104 thereby forcing the cam follower plate 102 and coulter disc assembly 38 to the straight ahead position therefor as indicated in FIG. 10.

Because steering movement of the coulter disc assemblies 38 and 38a is controlled by hydraulic cylinder units 52 and 52a, it can be seen that these hydraulic cylinder units must be disabled, i.e. made freely extensible and retractable, in order for the coulter disc assemblies to be adjustably rotated by the coating cam post 106 and cam follower plate 102. This is primarily accomplished by a solenoid valve 118 (on cross member 32 in FIG. 2) which provides fluid communication between hydraulic cylinder units 52 and 52a. Solenoid valve 118 is described in further detail below in connection with the hydraulic circuit for the invention.

Figure 2:
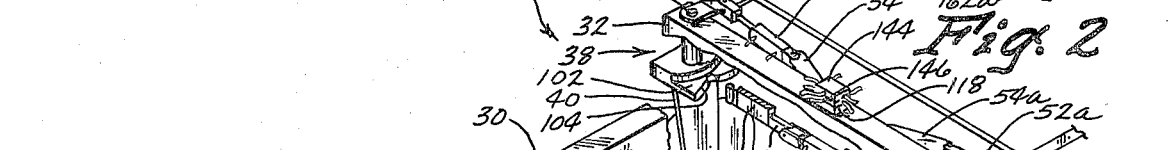
FIG. 2 is a combined electrical schematic and fluid circuit diagram of the steering apparatus in the steering mode therefor.

Referring to the hydraulic circuit diagram of FIG. 2, it is seen that hydraulic pressure to the implement is supplied through a pair of hydraulic lines 120 and 122 which are connected to a main control valve 124 on the tractor 14. The tractor motor 125 drives a pump 126 to draw fluid from a reservoir 128 and force it through supply line 130 to the control valve 124. Return line 132 permits the fluid flow from the control valve 124 back to the reservoir 128.

In the usual steering mode for the implement as shown in FIG. 2, the tractor control valve 124 is positioned so that line 120 is pressurized and line 122 is used for return flow. Both lines 120 and 122 are connected through respective hydraulic connectors 134 and 136 to a spool valve 138 which is operated by the row follower mechanism 56 as described in further detail below. Spool valve 138 is connected by lines 140 and 142 to hydraulic connectors 144 and 146 respectively which are shown in FIG. 3 as mounted in stacked relation with the solenoid valve 118. Hydraulic connector 144 has one input line 140 and three output lines 148, 150 and 152. Lines 148 and 150 communicate with the right hand inlet/outlet ports 154 and 154a of hydraulic cylinder units 52 and 52a respectively. Hydraulic line 152 communicates with one side of solenoid valve 118. Likewise, hydraulic connector 146 has one inlet line 142 and three output lines 156, 158 and 160. Lines 156 and 158 communicate with the left hand inlet/outlet ports 162 and 162a of hydraulic cylinder units 52 and 52a and line 160 communicates with the other side of solenoid valve 118. Finally, hydraulic connectors 134 and 136 are connected by hydraulic lines 164 and 166 to opposite ports of hydraulic cylinder unit 114.

Spool valve 138 is operatively connected to the row follower mechanism 56 to actuate hydraulic cylinder units 52 and 52a in response to pivotal movement of the drag links 60 and 62 about the upright trunnion shaft 72. Referring to FIG. 11, trunnion shaft 72 has a crank arm 168 extended transversely therefrom. A linkage 170 is pivotally connected at one end to crank arm 168 and pivotally connected to the other end to the spool 172 of valve 138.

Figure 4:
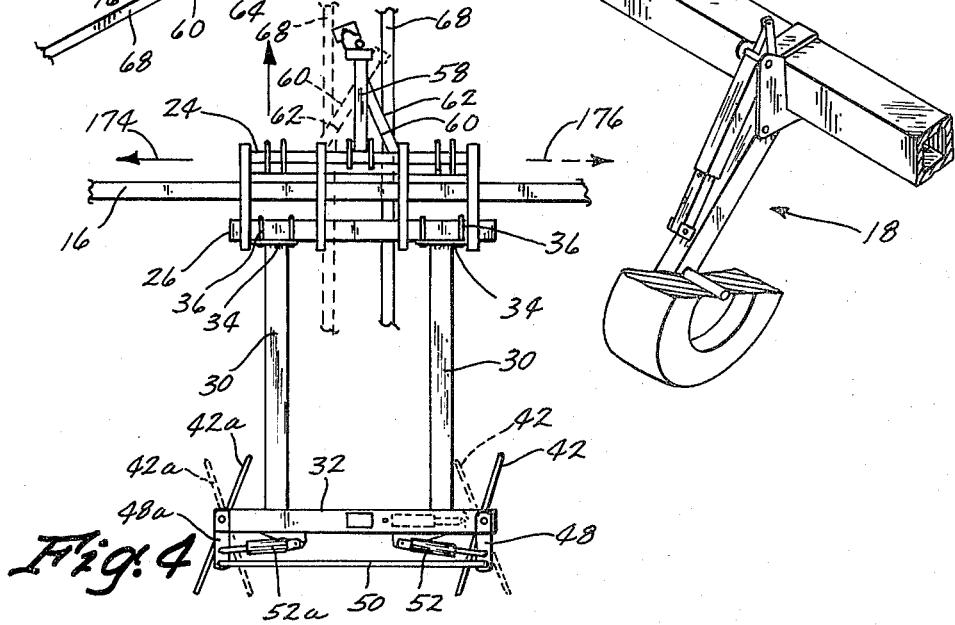
FIG. 4 is a top plan view of the steering apparatus showing the pivotal movement of the coulter discs responsive to transverse movement of the tool bar in either direction.

Accordingly, referring to FIG. 4, it can be seen that when the tool bar 16 is shifted in the direction of solid line arrow 174, drag links 60 and 62 are rotated to the solid line positions. The associated rotation of the trunnion shaft adjusts the spool valve to direct fluid to line 140 to contract hydraulic cylinder unit 52 and extend hydraulic cylinder unit 52a. As a result, the coulter disc assemblies 38 and 38a are steered to the solid line positions shown in FIG. 4 to force the implement in a direction opposite arrow 174 back to the transversely aligned position relative to the crop rows. Likewise, if the tool bar 16 is shifted in the direction of dotted line arrow 176, the drag links are rotated to the dotted line positions therefore such that the spool valve 138 is adjusted to direct hydraulic fluid through line 142 to steer the coulter disc assemblies 38 and 38a to the dotted line positions therefor.

In operation, a farmer adjusts the tractor control valve 124 to the steering mode shown in FIG. 2, then lowers the implement 10 on three-point hitch 12 so that the finder wheels 64 are placed into guide furrow 68 and the ground working tools 20 and 21 are placed in ground engagement. The tractor is then advanced across the field with the steering apparatus 28 assisting to correctly position the tool bar 16 relative to the crop rows.

At the end of a crop row, the implement 10 is raised on the three-point hitch 12 out of ground engagement and hydraulic control valve 124 is shifted to the position shown in FIG. 6 corresponding to the synchronizing mode for the invention. In the synchronizing mode, hydraulic line 122 is pressurized and hydraulic line 122 is used for return flow. A check valve 178 interposed between connector 136 and spool valve 138 prevents fluid flow to the spool valve. Hydraulic fluid is directed through line 166 to extend hydraulic cylinder 114 which forces slide rod 110 toward the cam follower plate 102 of coulter disc assembly 38. Engagement of bearing sleeve 108 against the V-shaped cam follower surface of plate 102 rotates the coulter disc assembly 38 to the straight ahead position therefor. Since both coulter disc assemblies 38 and 38a are interconnected by linkage 50 for steering movement in unison, both are automatically rotated to the straight ahead positions therefor. In order to accomplish this, it is necessary that fluid communication be established between the ports of hydraulic cylinders 52 and 52a in order that they may be freely extended or retracted as necessary.

As the slide rod cylinder 114 is extended, a laterally extended arm 180 on the piston portion thereof is disengaged from the push button control 182 of a micro-switch 184. The micro-switch thus completes a circuit from ground through battery 186 to activate the solenoid 188 of solenoid valve 118. Upon activation, valve 118 establishes communication between hydraulic lines 152 and 160 with the result that all four ports 154 and 154a and 162 and 162a of hydraulic cylinders 52 and 52a are disposed in communication with one another. As a result, the coulter disc assemblies 38 and 38a are freely moved to the straight ahead positions upon engagement of cam post 106 and V-shaped cam follower surface 104.

It will be understood that when the implement was raised out of ground engagement, the drag links 60 and 62 were pivoted downwardly by the action of gravity from the positions shown in FIG. 1 to the positions of FIG. 5. Accordingly, the forward tips 90 of the drag links strike the bottom of lock plate 86 as shown in FIG. 8 to automatically move the drag links 60 and 62 to the neutral positions therefor as described above.

With the row follower mechanism 56 and coulter disc assemblies 38 and 38a of the steering apparatus 28 thus synchronized, the farmer need only shift control valve 124 back to the position of FIG. 2 to return the hydraulic circuit to the steering mode therefor. Hydraulic pressure is again directed through lines 120 and 164 to retract slide rod cylinder 114. Control arm 180 thus opens micro-switch 184 so that solenoid 188 is deactivated and solenoid valve 118 again interrupts communication between hydraulic lines 152 and 160. When the implement 10 is lowered again for the next pass through the field, the synchronized steering apparatus and row follower means are already in the centered positions therefor. The precise control of the steering apparatus afforded by the present invention enables the operator to set the ground working tools 21 closer to the crop rows and to travel at faster speeds with less danger of crop damage.

Accordingly, there has been shown and described an apparatus for synchronizing the steering and row follower devices of a row crop implement which accomplishes at least all of the stated objects.

I claim:

1. In combination with a row crop implement including an elongated tool bar and a steering apparatus on the tool bar comprising a steerable coulter disc, a row follower means movable to a neutral position when the tool bar is transversely aligned relative to the crop rows, and a steering means for steering said coulter disc, in response to movement of the row follower means from said neutral position, said row follower means and coulter disc being disposed in synchronized relation when said row follower means is in said neutral position and said coulter disc is positioned for straight ahead movement of the implement, the improvement comprising, first means for moving said row follower means to the neutral position therefor, second means for disabling and enabling said steering means, and third means for steerably positioning said coulter disc, while said steering means is disabled, for straight ahead movement of the implement whereby, with said row follower means moved to the neutral position therefor by said first means, said row follower means and coulter disc are disposed in synchronized relation upon enablement of said steering means.

2. The combination of claim 1 wherein said row follower means comprises a linkage operatively connected to said tool bar for pivotal movement about generally horizontal and vertical axes, and said first means comprises coacting cam and cam follower means, one of said coacting means being operatively connected to said linkage and the other being operatively connected to said tool bar, said cam and cam follower means being engaged in response to pivotal movement of said linkage about said generally horizontal axis.

3. The combination of claim 2 wherein said cam follower means includes a generally V-shaped surface.

4. The combination of claim 3 wherein one of said coacting cam and cam follower means includes a lock plate supported for pivotal movement about said generally horizontal axis, said lock plate being engaged by said linkage in response to pivotal movement of said linkage about the generally horizontal axis to bias said coacting means into engagement.

5. The combination of claim 4 wherein said cam means comprises an upright cam post secured relative to said tool bar.

6. The combination of claim 4 wherein said lock plate is elevated when engaged by one end of said linkage in response to downward pivotal movement of the other end of the linkage by gravity.

7. The combination of claim 1 wherein said steering means includes an extensible and retractable power means pivotally secured at one end relative to said tool bar and operatively connected at the other end of said coulter disc to steer said disc, said second means comprising means actuatable to provide for the free extension and retraction of said power means.

8. The combination of claim 7 wherein said power means comprises a double acting hydraulic cylinder unit having a pair of spaced apart inlet/outlet ports, said second means comprising means for providing fluid communication between said pair of inlet/outlet ports.

9. The combination of claim 8 wherein said means for providing fluid communication between said ports comprises hydraulic conduit means interconnecting said ports and a control valve disposed along said conduit means.

10. The combination of claim 8 wherein said steering apparatus includes a pair of steerable coulter discs and said steering means includes a pair of double acting hydraulic cylinder units operatively connected to said discs, each unit having a pair of spaced apart inlet/outlet ports and each port of one unit being disposed in fluid communication with a port of the other unit, said second means including means actuatable to provide fluid communication between all four of said ports.

11. The combination of claim 1 wherein said third means comprises coacting cam and cam follower means, one of said coacting means being operatively connected to said coulter disc for steering movement therewith, the other of said coacting means being operatively connected to said tool bar for movement into and out of engagement with said one coacting means, and power means operatively connected to said tool bar for moving said coacting means into engagement, said coulter disc being steerably positioned for straight ahead movement of the implement in response to engagement of said coacting means.

12. The combination of claim 11 wherein said cam follower means comprises a generally V-shaped surface.

13. The combination of claim 12 wherein said cam means comprises an upright cam post.

14. In combination with a row crop implement including an elongated tool bar, lift means for raising and lowering said tool bar between a lowered working position and an elevated transport position, and a steering apparatus on the tool bar comprising a steerable coulter disc, a row follower means movable to a neutral position when the tool bar is transversely aligned relative to the crop rows, and a steering means for steering said coulter disc in response to movement of the row follower means from said neutral position, said row follower means and coulter disc being disposed in synchronized relation when said row follower means is in said neutral position and said coulter disc is positioned for straight ahead movement of the implement, the improvement comprising, first means for moving said row follower means to the neutral position therefor in response to raising movement of said tool bar to the elevated transport position therefor, second means for disabling and enabling said steering means, and third means for steerably positioning said coulter disc, when said steering means is disabled and said tool bar is in the elevated transport position therefor, for straight ahead movement of the implement whereby said row follower means and coulter disc are disposed in synchronized relation upon enablement of said steering means.

* * * * *